United States Patent [19]
Knutsen

[11] 3,896,943
[45] July 29, 1975

[54] APPARATUS FOR UNLOADING MATERIAL SUCH AS CHIPS OR THE LIKE FROM THE BOTTOM OF A SILO

[75] Inventor: Roald Willies Knutsen, Arendal, Norway

[73] Assignee: Saxlund A/S, Risor, Norway

[22] Filed: Sept. 25, 1973

[21] Appl. No.: 400,513

[30] Foreign Application Priority Data
Sept. 27, 1972 Norway.............................. 3459/72

[52] U.S. Cl............................................. 214/17 DA
[51] Int. Cl.............................................. B65g 65/46
[58] Field of Search ......... 214/17 D, 17 DA, 17 DB

[56] References Cited
UNITED STATES PATENTS
2,755,942   7/1956   Broberg.......................... 214/17 DA
3,091,351   5/1963   Wellford et al................ 214/17 DA Primary Examiner—Robert G. Sheridan
Attorney, Agent, or Firm—Ulle C. Linton

[57] ABSTRACT

An apparatus for unloading material such as chips or the like from the bottom of a silo, comprising a conveyer screw mounted on an annular frame which surrounds a central outlet orifice in the bottom of the silo, and which can be rotated about the central axis of the silo for swinging said screw along the bottom of the silo. The screw is also mounted for rotation about its longitudinal axis for conveyance of material to the outlet orifice. The rotation of the screw is effected by means of a motor which is mounted stationary independently of the rotating frame, and the power transmission takes place through a drive shaft extending along the central axis, and a countershaft which is mounted on the rotating annular frame and arranged parallel to but offset from the first shaft. The swinging motion of the screw is performed by means of a hydraulic device which is mounted at the outer end of the conveyer screw. The hydraulic device cooperates with the inner circumference of the silo and communicates with a stationary source of hydraulic motive fluid outside the silo, the hydraulic fluid passing through a bore in the drive shaft, through a flexible conduit between the upper end of the drive shaft and the inner end of the screw and through the screw itself.

On the annular frame there is attached an outlet funnel which is situated beneath the inner end of the screw but laterally offset from the central axis of the silo to the side opposite from the countershaft.

The outlet funnel leads to a stationary container, the walls of the container having an increasing distance from the central axis to a lateral tangential outlet. On the portion of the first shaft which extends through the container, a paddle means is secured. Upon rotation the paddle means will move the material received in the container to the lateral outlet.

8 Claims, 2 Drawing Figures

APPARATUS FOR UNLOADING MATERIAL SUCH AS CHIPS OR THE LIKE FROM THE BOTTOM OF A SILO

BACKGROUND OF THE INVENTION

The present invention relates to an apparatus for unloading material such as chips or the like from the bottom of a silo, comprising a conveyor screw which is mounted on an annular frame which surrounds a central outlet orifice in the bottom of the silo, and which can be rotated about the central axis of the silo for swinging said screw along the bottom of the silo, said screw also being mounted for rotation about its longitudinal axis for conveyance of material to said outlet orifice, the rotation of the screw being effected by a motor which is mounted stationary independently of the rotating frame, the power transmission taking place through a drive shaft extending along said central axis, whereas the swinging movement is effected by a hydraulic device which is provided at the outer end of the screw, said hydraulic device cooperating with the inner circumference of the silo and communicating with a stationary source of hydraulic motive fluid outside the silo.

From U.S. Pat. No. 3,050,201 there is known an unloading apparatus which comprises only one drive motor which is arranged stationary outside the parts which follow the swinging motion of the conveyer screw. This motor gives the screw both its swinging and its rotating motion, the power transmission being effected through a drive shaft which extends centrally through the bottom of the silo. The disadvantage of such an apparatus is that the drive shaft must be mounted in a lip which extends into the outlet orifice of the silo. This entails that unloading apparatuses of this type cannot be utilized if the silo contains material such as chips or the like, as such material will pile up on the lip and clog the outlet orifice. Besides, the movement of the screw about its central axis is dependent upon the rotational movement of the screw, and the swinging movement of the screw is also dependent upon the reaction pressure exerted by the material conveyed by the screw.

In U.S. Pat. No. 3,391,809 there is disclosed an apparatus which would give the same unloading problems as described in connection with the abovementioned patent specification, as the framework which carries the rotating annular frame onto which the inner end of the conveyer screw is mounted, as well as the pipes leading to the hydraulic drive means on the frame, extend into the outlet orifice through which the material in the silo is discharged.

An apparatus according to Deutsche Auslegungsschrift 2,010,214 solves the problem of obtaining a free outlet orifice for the content of the silo, in that the bearing of the rotating frame extends around the outlet orifice, i.e., the outlet orifice and a subsequent outlet funnel are provided inside the bearing, which is arranged at the periphery of the rotating frame. The advantages of an unobstructed outlet orifice is achieved by arranging all the drive motors on the rotating frame. However, an apparatus of this type suffers from the disadvantage that the rotating frame and thereby the screw cannot swing continuously in the same direction due to the wires for the current supply to the drive motors. The screw therefore has to sweep back and forth over the bottom of the silo, thus complicating the installation, since such a reciprocating movement requires additional control equipment. To obtain a continuous swinging movement of the screw in one direction collector ring means would be required, which means is very unfavourable in the circumstances under which the silo operates.

SUMMARY OF THE INVENTION

The object of the present invention is to provide an apparatus wherein said disadvantages are eliminated. In an apparatus of the type described in the first paragraph of the specification, this is achieved by a structure in which the frame carries an outlet funnel which is situated beneath the inner end of the screw and offset from the central axis, said funnel rotating around said shaft and leading down to a stationary container through which said shaft extends centrally, the walls of said container preferably having an increasing distance from the central axis to a preferably tangential lateral outlet, said shaft having a central bore which in itself serves as or contains a conduit for motive fluid, said conduit connecting said source of hydraulic fluid and the hydraulic device for movement of the screw along the bottom of the silo.

DESCRIPTION OF THE PREFERRED EMBODIMENT

Further features and advantages of the invention will appear from the claims, and an embodiment according to the invention will in the following be described with reference to the accompanying drawings.

Figure 1:
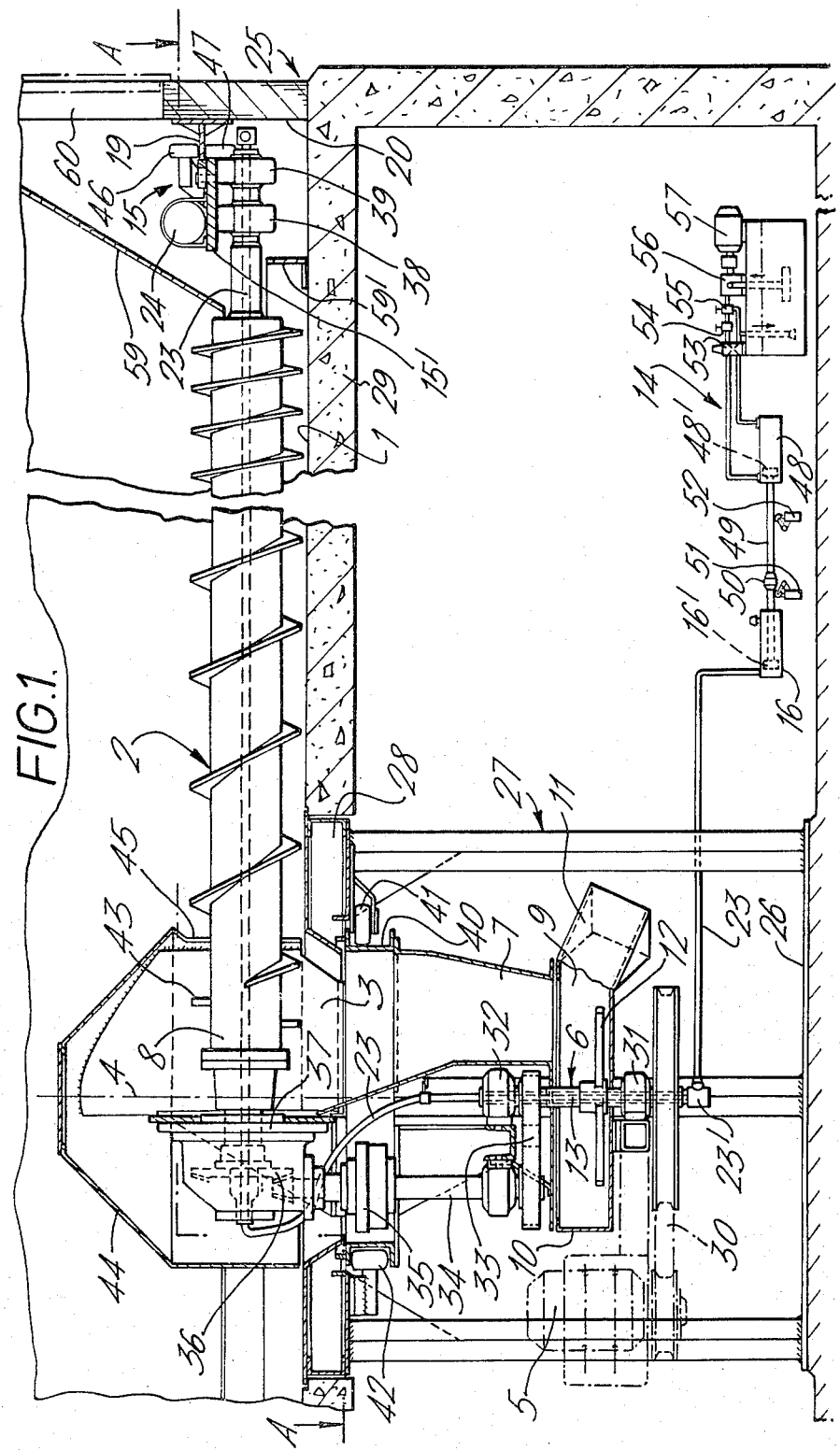
FIG. 1 is a sectional side view of the silo.
Figure 2:
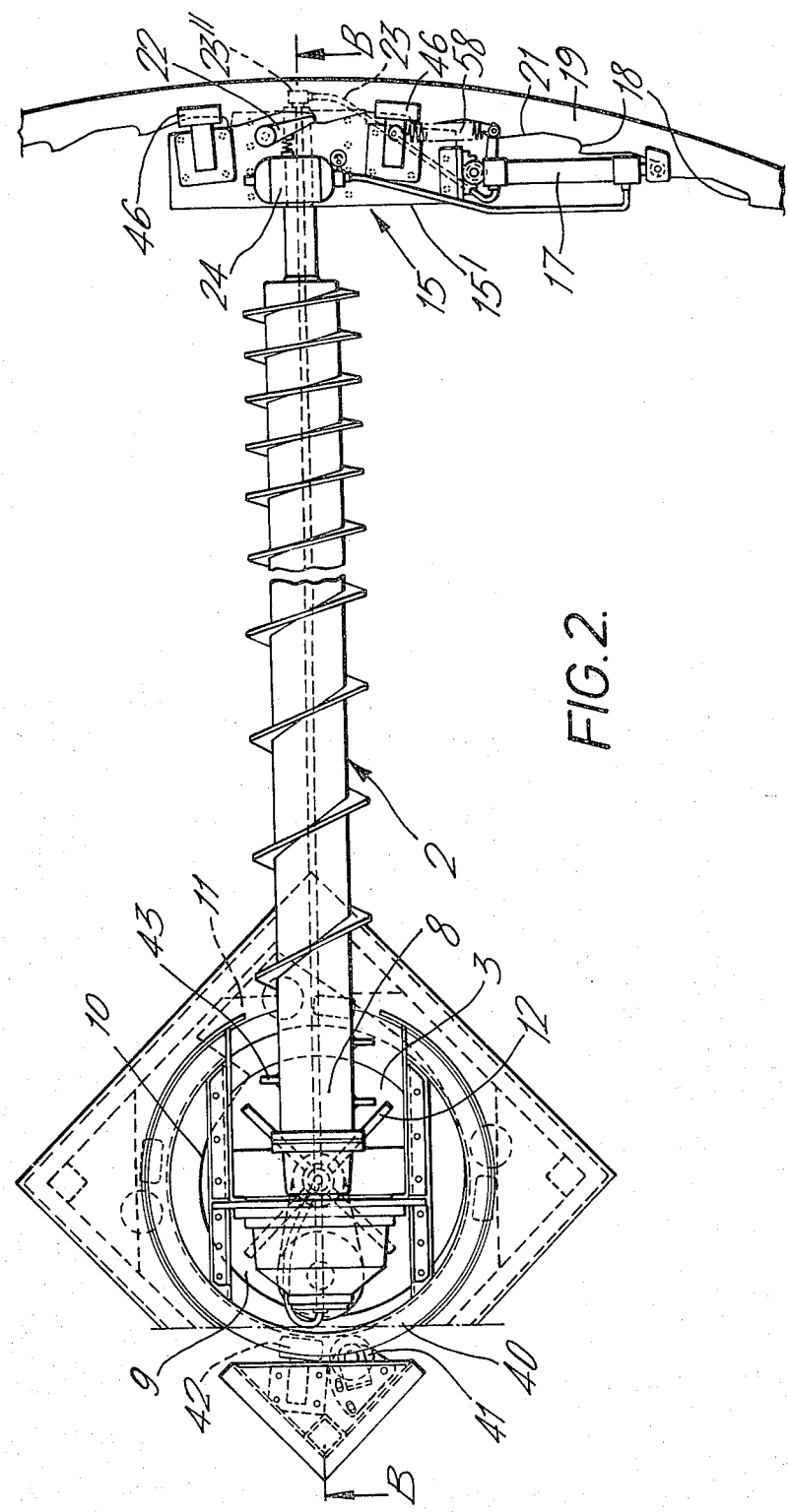
FIG. 2 is a sectional view taken along line A—A in FIG. 1.

In FIG. 1, 25 designates the silo itself, and the bottom and walls of the silo are designated 1 and 20 respectively. On a base 26 beneath the floor 29 of the silo there is erected a framework 27 having an upper portion 28 extending through the floor 29 and having its top surface in the same plane as the bottom 1 of the silo.

On the framework 27 there is mounted a drive motor 5 which via a V belt drive 30 drives a shaft 6 extending in the central axis of the silo and mounted in a stationary bearing 31 and a bearing 32 which is rotatable relative to the stationary bearing 31. A second shaft 34 is rotated via a transmission 33, and this shaft 34 will rotate a conveyer screw 2 via a clutch 35 and a gear transmission 36. For rotation about its longitudinal axis the conveyer screw is mounted at its inner end in a bearing 37 and at its outer end in bearings 38 and 39. The bearings 38 and 39 are attached to a plate 15' which carries a device 15 which swings the screw 2 around the central axis 4 of the silo, and which will be described below in further details.

Centrally in the framework 27, the central axis of which coincides with the central axis 4 of the silo, is provided a circular orifice 3 in which an annular frame 40 is rotatably mounted. The frame 40 is mounted horizontally and vertically by means of horizontal and vertical rollers 41 and 42 respectively, the shafts of which are attached to the upper portion 28 of the framework.

The frame 40 carries said clutch 35 and the braces for the inner bearing 37 of the conveyer screw as well as an outlet funnel 7.

The outlet funnel 7 is positioned in the central opening 3 of the framework 27, but offset from the central axis 4. The outlet funnel 7 follows the swinging movement of the screw and is positioned beneath the inner end 8 of the screw 2. Further, it leads down to a stationary container 9 which is coaxial with the silo 25, and which has walls 10 having an increasing distance from the central axis 4 to a tangential outlet 11 at the side of the container 9.

Within the container 9 a paddle means 12 is attached to the shaft 6. When the shaft rotates, the paddle means 12 will carry the material received in the container 9 to the outlet 11.

To the inner end 8 of the screw there are attached protruding ribs or studs 43 for tearing apart the material conveyed by the screw 2, so that the material will fall through the outlet funnel 7 to the container 9 as a loose mass.

Above the transmission 36 and the inner portion 8 of the screw there is provided a housing 44 which is attached to the frame 40, and which protects the central parts of the apparatus against the content of the silo 25. In the housing 44 there is provided an opening 45 through which the screw 2 extends, and through which the material can be conveyed.

The aforementioned frame 40 with its rollers supports the screw 2 at its inner end 8, thus permitting the swinging movement of the screw 2. Upper and lower rollers 46 and 47 support the outer end of the screw 2. The rollers 46 and 47 are mounted on the plate 15' and bear against an inwardly directed flange 19 which is secured along the inner wall 20 of the silo.

The shaft 6 has a central bore 13 containing a conduit 23 for hydraulic liquid. The hydraulic conduit establishes a connection between a stationary source 14 of hydraulic liquid and the device 15 which moves the screw 2 around the central axis 4 of the silo and along the bottom 1 thereof.

The stationary source 14 of the hydraulic liquid comprises a first cylinder 16, whereas the aforementioned device 15 comprises a second cylinder 17. The cylinder 17 is operated by hydraulic liquid from the first mentioned cylinder 16, the piston 16' of which is forced back and forth by a piston rod 49 connected to a third cylinder 48. On the piston rod 49 there is provided a stop 50 which activates a head and tail limit switch 51 and 52 respectively. Signals from the limit switches 51 and 52 activate a two-way-valve 53 which causes the hydraulic liquid from the source 14 to exert a pressure on one side or the other of the piston 48' of the cylinder 48. In connection with the source 14 there is also provided a quantity valve 54, a pressure control valve 55, a pump 56 and a motor 57.

As mentioned above, the hydraulic cylinder 17 of the device 15 is operated by hydraulic liquid from the cylinder 16, and between the cylinders 16 and 17 the liquid is connected via the hydraulic conduit 23 which from the cylinder 16 terminates through an adapter 23' in the bore 13 of the shaft 6. The conduit 23 continues from the shaft 6 through the conveyer screw 2 and is connected to the cylinder 17 via another adapter 23''.

When the pressure in the cylinder 16 increases, i.e., when the piston 16' in FIG. 1 moves to the left, the cylinder 17 will be extended, and since it cooperates with abutment faces 18 along the inner circumference of the silo, the desired swinging movement of the screw 2 around the central axis 4 of the silo is achieved. The abutment faces 18 which are formed in the edge of the inwardly directed flange 19 on the side wall 20, are circumferentially spaced a distance which is a little shorter than the stroke performed by the cylinder 17, and the abutment faces 18 are interconnected via cam faces 21 which together with the abutment faces 18 form a saw-toothed circumferential face. The cylinder 17 is spring biased towards the circumferential face by means of a spring 58. A catch 22 is spring loaded towards said circumferential face, and when said catch 22 is bearing against one of the abutment faces 18, it prevents backward swinging of the screw 2 when the cylinder 17 is shortened to engage another abutment face 18.

That chamber in the cylinder 17 which by expansion effects an extension on the cylinder 17, communicates with the hydraulic conduit 23 from the stationary cylinder 16, whereas the other chamber in the cylinder 17 communicates with a pressure storage chamber 24 which effects shortening of the cylinder 17 when the pressure in the stationary cylinder 16 is relieved.

A shield 59 extends around the circumference of the wall 20 of the silo and is designed so as to cover the device 15 and the outer part of the screw 2 in the lower peripheral area of the silo. Another annular shield 59' is provided on the bottom 1 of the silo and prevents material in the silo from being forced into the area where the device 15 is moving. An inspection hatch 60 is provided in the wall 20 of the silo to allow access for maintenance and control of the device 15.

The operation of the described embodiment is as follows:

The stationary motor 5 on the framework 27 rotates the conveyer screw 2 via the V belt drive 30, the shaft 6, the transmission 33, the shaft 34, the clutch 35 and the gear transmission 36. The bearing 31 is stationary, whereas the bearing 32 is rotatable relative to the bearing 31, being indirectly attached to the frame 40.

The transmission 33, the shaft 34, the clutch 35 and the transmission 36 are also indirectly attached to the frame 40 and will thus together with the bearing 32 follow the swinging motion of the screw 2 or the corresponding rotating movement of the frame 40.

The rotation of the screw 20 can therefore take place independently of the position of the screw along the floor, and the screw 2 can swing continuously and in the same direction around the central axis 4 of the silo and along the bottom 1 thereof.

During rotation of the screw 2 the content of the silo is conveyed along the conveyer screw 2 and towards the inner end 8 thereof. Here, the studs 43 will tear the material conveyed by the screw 2, the material thus obtaining a suitable loose texture before falling down in the container 9 through the outlet funnel 7.

When the shaft 6 rotates, i.e., when also the screw 2 rotates, the paddle means 12 moves the material from the container 9 to the outlet 11, below which suitable collecting means may be positioned.

The swinging motion of the screw 2 is achieved by the hydraulic pressure in the cylinder 16 being transmitted via a hydraulic liquid through the conduit 23 to the cylinder 17 of the device 15. The cylinder 17 is extended and shortened in steps with the movement performed by the piston 16' in the cylinder 16. The forward and rearward motion of the piston 16' is effected via the piston rod 49, the stroke of which is set by means of the stop 50 and the two limit switches 51 and 52 which transmit signals to the two-way-valve 53.

In the disclosed embodiment the hydraulic pressure connection between cylinder 16 and cylinder 17 may be effected with variable or constant pressure. Besides the pressure by which the screw 2 is swung, also the speed of the swinging movement of the screw 2 can be controlled, for example in relation to the height of the material in the silo 25.

The disclosed embodiment can be varied within wide limits without exceeding the scope of the invention. For example the motive fluid for movement of the cylinder 17 of the device 15 may be air or another suitable fluid. Further, the motive fluid of the cylinder 17 may be connected to the stationary cylinder 16 via a dual-pipe system. The pressure storage chamber 24 of the movable device 15 could then be eliminated. However, a single-pipe system for the drive fluid is, of course, simpler in many respects.

What I claim is:

1. In apparatus for unloading material such as chips or the like from the bottom of a silo having a bottom outlet orifice, comprising a conveyer screw, an annular frame surrounding the outlet orifice in the bottom of the silo and having said screw mounted thereon, said frame being arranged for rotation about the central axis of the silo for allowing swinging of said screw along the bottom of the silo,
 - a motor mounted stationarily independently of said rotary frame for rotating said screw about its longitudinal axis for conveying material to said outlet orifice,
 - a drive shaft extending along said central axis for effecting power transmission between stationary motor and the rotary screw,
 - a hydraulic device provided at the outer end of said screw and cooperating with the inner circumference of the silo,
 - a stationary source of hydraulic motive fluid outside the silo, said source communicating with said hydraulic device, the improvement comprising:
 - an outlet funnel carried by said rotary frame and located beneath the inner end of said screw and offset from its central axis,
 - a stationary container through which said shaft extends centrally and down to which said rotary outlet funnel is leading, the walls of said container having an increasing distance from the central axis to a substantially tangential lateral outlet, and said shaft having a central bore through which said source of hydraulic fluid communicates with said hydraulic device for supplying motive fluid to the latter for driving the screw along the bottom of the silo.

2. Apparatus as claimed in claim 1, characterized in that the part of the drive shaft which extend through the container further comprises a paddle means secured thereto, said paddle means upon rotation moving the material received in the container to the outlet.

3. Apparatus as claimed in claim 1, characterized in that it further comprises a second shaft which is mounted on the frame parallel to said drive shaft on the opposite side of said funnel, and which drivingly engages the end of said screw in power transmitting engagement with said drive shaft.

4. Apparatus as claimed in claim 1, characterized in that said conduit for passing hydraulic motive fluid through said drive shaft leaves the upper end of said shaft and the central axis to connect with the inner end of said screw and communicate with the swinging device through the interior of the screw.

5. Apparatus as claimed in claim 4, characterized in that the stationary source of pressure fluid comprises a first hydraulic cylinder, and that said hydraulic device comprises a second hydraulic cylinder which is operated by hydraulic liquid from said first cylinder and cooperates with abutment faces facing in the tangential direction and being arranged along the inner circumference of the silo, said second hydraulic cylinder thereby providing the desired swinging motion of the screw around the central axis of the silo.

6. Apparatus as claimed in claim 5, characterized in that the abutment faces, which preferably are arranged at the edge of an inwardly facing flange on the wall of the silo, are circumferentially spaced a distance which is somewhat shorter than the stroke of the second cylinder, and are interconnected via cam faces which together with the abutment faces form a saw-toothed circumferential face, and that said second cylinder is spring baised towards said circumferential face.

7. Apparatus as claimed in claim 6, characterized in that the device comprises a catch which is spring baised towards said circumferential face, and which, when bearing against one of the abutment faces, prevents return swinging of the screw when the second cylinder is shortened to engage another face.

8. Apparatus as claimed in claim 5, characterized in that the chamber in the second hydraulic cylinder which when expanded effects an extension of said cylinder, communicates with a hydraulic conduit from the stationary first cylinder, whereas the second chamber in the second cylinder communicates with a pressure storage chamber which effects a shortening of said second cylinder when the pressure in the stationary cylinder is relieved.

* * * * *